(12) United States Patent
Mautsch et al.

(10) Patent No.: US 6,170,876 B1
(45) Date of Patent: Jan. 9, 2001

(54) SAFETY BELT ARRANGEMENT

(75) Inventors: Jürgen Mautsch, Senden; Horst Krammel, Wettstetten, both of (DE)

(73) Assignee: Takata (Europe) Vehicle Safety Technology GmbH, Ulm (DE)

( * ) Notice: Under 35 U.S.C. 154(b), the term of this patent shall be extended for 0 days.

(21) Appl. No.: 09/247,810

(22) Filed: Feb. 11, 1999

(30) Foreign Application Priority Data

Mar. 11, 1998 (DE) .............................................. 198 10 577

(51) Int. Cl.$^7$ .................................................. B60R 22/36
(52) U.S. Cl. ............................................ 280/806; 297/480
(58) Field of Search .................................. 280/805, 806, 280/808; 297/470, 471, 480; 242/379.1

(56) References Cited

U.S. PATENT DOCUMENTS

| | | |
|---|---|---|
| 4,327,881 * | 5/1982 | Fohl ...................................... 280/806 |
| 4,494,774 * | 1/1985 | Fohl ...................................... 280/806 |
| 5,286,058 * | 2/1994 | Wier ...................................... 280/808 |
| 5,415,432 | 5/1995 | Thomas . |
| 5,415,433 | 5/1995 | Pfeiffer . |
| 5,673,936 | 10/1997 | Mondel . |

FOREIGN PATENT DOCUMENTS

| | | |
|---|---|---|
| 79 01 785 | 4/1979 | (DE) . |
| 29 12 248 | 10/1980 | (DE) . |
| 34 01 938 | 1/1984 | (DE) . |
| 295 02 192 U | 6/1995 | (DE) . |
| 2 524 326 | 4/1982 | (FR) . |
| 2 189 377 | 10/1987 | (GB) . |

* cited by examiner

*Primary Examiner*—Paul N. Dickson
(74) *Attorney, Agent, or Firm*—Foley & Lardner

(57) ABSTRACT

A safety belt arrangement comprising a holder which can be pivotally connected to a vehicle part about an axis which has a guide roller between two bearings. In the fastened state at least a band part of the belt band which partially wraps around the guide roller extends at an inclination to the axis of rotation of the guide roller. At increased brake forces the guide roller enters into engagement with a projection.

26 Claims, 3 Drawing Sheets

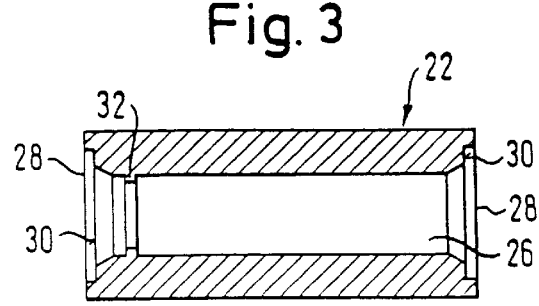
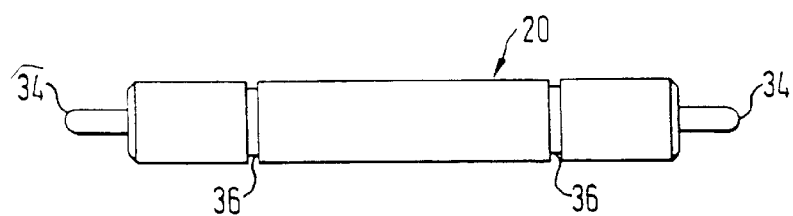
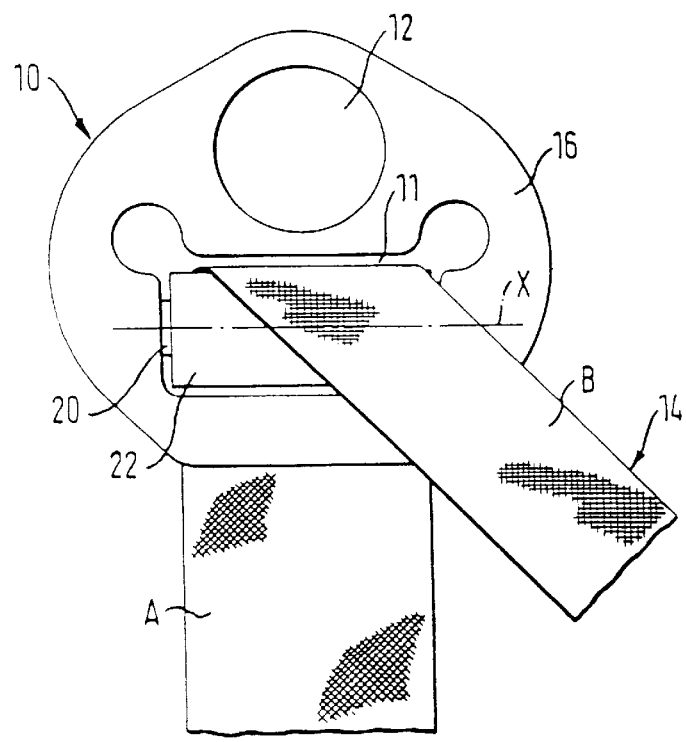
PRIOR ART

SAFETY BELT ARRANGEMENT

BACKGROUND OF THE INVENTION

The invention relates to a safety belt arrangement with a holder which can be fastened to a vehicle part and which journals a guide roller between two bearings, with at least one band part of the belt band which partially wraps around the guide roller extending at an inclination to the axis of rotation of the guide roller in the fastened state.

Roller guides are basically known in various variants. Safety belt arrangements of this kind are used in motor vehicles in order to deflect the belt band which is unwound from a belt roller in the direction towards the passenger. FIG. 8 shows a roller guide for a safety belt which has a holder 10 of metal which is approximately oval in a plan view and in which a cut-out 11 which is basically rectangular and upwardly open is provided for a guide roller 22. Above the cut-out 11 a circular opening 12 for the fastening of the holder 10 to a vehicle is provided centrally in the holder 10. A shaft 20 is rotatably fastened between two bearings in order to be able to rotate the guide roller 22 in a friction-poor manner when the belt band 14, which is guided around the guide roller 22, is moved, for example in order to put on the safety belt.

In the fastened state of this safety belt arrangement, that is, when the safety belt 14 has been put on by a passenger, the safety belt 14 partially wraps around the guide roller 22. In this the band part B of the belt band 14 extends at an inclination to the axis of rotation of the guide roller 22 in the situation illustrated in FIG. 8. The band part A of the belt band 14 extends at right angles to the axis of rotation of the guide roller 22. In addition to the situation illustrated in FIG. 8, however, in the fastened state both band parts A and B of the belt band 14 can also extend at an inclination to the axis of rotation of the guide roller 22.

The inventors of the present application have recognised that in a safety belt arrangement such as is shown in FIG. 8, the belt band 14 is no longer correctly guided via the guide roller 22 at higher belt forces but rather is transported laterally (to the right in FIG. 8) as a result of the skewing present between the belt band parts A and B. This can have the result that the resulting force of the belt band 14 runs out of the axis of rotation of the holder 10, so that the guide fitting executes an undesirable and abrupt movement. In this the belt band can be completely pulled into a corner of the deflection, which can impair the correct functioning of the safety belt arrangement, in particular when additional safety devices such as belt tighteners are provided.

SUMMARY OF THE INVENTION

The problem (object) underlying the invention is to provide a safety belt arrangement of the initially named kind in which a correct deflection of the belt band about the guide roller is ensured even at increased belt forces.

This object is satisfied by the features of claim 1 and in particular in that the journalling of the guide roller is designed elastically and in that a brake device is provided which enters into engagement with the guide roller at increased belt forces. A brake device of this kind can for example be formed in that the shaft on which the guide roller is journalled or the bearings on which the shaft is journalled are designed elastically.

Through the brake device provided in accordance with the invention the guide roller is braked or completely blocked at increased belt speeds, through which a lateral transport of the belt band on the guide roller is avoided. Since a skewed belt band which is guided around a guide roller is laterally transported during the application of a drawing force only when very large belt forces are present and when the guide roller can rotate, the brake device provided in accordance with the invention prevents an undesirable lateral transport of the belt band in an effective manner. The brake device is preferably released from engagement when the belt forces let up so that in this case the guide roller can again rotate freely.

Advantageous embodiments of the invention are described in the description, in the drawings and in the subordinate claims.

The safety belt arrangement in accordance with the invention has at least one, preferably two resiliently executed bearings, through which it is ensured that forces which are exerted on the safety belt—and thus also on the guide roller or the bearings respectively—are first taken up by the resiliently executed bearing. When large forces arise, the bearing deforms elastically to such an extent that the guide roller is pressed against an abutment or the like so that the rotational movement of the guide roller is braked or stopped respectively. Subsequently the belt band can slide over the braked guide roller without a transverse movement arising in the region of the guide roller.

In accordance with a further advantageous embodiment the bearing can have a sleeve-like shape and be open at one end and closed at an opposite end, through which a simple manufacture is possible. The bearing can be manufactured by an injection moulding or an extrusion process.

In a third preferred embodiment of the invention the bearing can be widened at the outer periphery of the open end, through which the bearing can be reliably held by the widened edge in an aperture of the holder and a sliding in of the bearing into the aperture is excluded.

In a further embodiment the bearing can have at the open end a plurality of slit-like or conical cut-outs extending in the axial direction that is parallel to the axis of rotation of the guide roller, which are preferably arranged to lie opposite one another. Through this the bearing can be compressed slightly at the open end and can be pressed into an aperture in the holder in the axial direction, through which its installation is facilitated.

A good spring action for a shaft results in accordance with a further advantageous embodiment of the invention if the bearing is inserted into an aperture in the holder which is executed as a passage bore. In this case the bearing has a free space in order to be resilient in the axial direction.

In accordance with a further embodiment of the invention the bearing can have a convex bearing surface at the closed end and in the interior which is preferably arranged concentrically at an inner end face. The contact surface of the guide roller or its shaft respectively in the bearing is thereby minimised, and through the point contact between the shaft end and the bearing the frictional forces can be considerably reduced. Through the low wear arising which is connected therewith, a long lifetime of the bearing is furthermore ensured.

In accordance with a preferred embodiment the bearing can be made cylindrical and have at least two regions with different diameters. Furthermore, the bearing can have the larger diameter at the side of the open end and preferably form a contraction after about one half its length. The bearing can also have a section of varying diameter-shaped cross-section between the two regions of different diameter, with a good spring action being achieved through this special shaping of the bearing. The section of varying diameter can at least partially extend inside the region with the greater diameter.

It is advantageous if the bearing lies with the outer surface of the region with the greater diameter in contact with a wall of the aperture of the holder. Through this a good area contact with the holder is possible, through which a high and uniform force transmission can take place.

The bearing can preferably consist of a plastic, e.g. of polyoxymethylene, which preferably has a Teflon reinforcement. Through the high cristallinity, the construction material polyoxymethylene (POM) can be machined to a very hard, stiff, percussion-tough and abrasion-proof bearing. The strength and stiffness of the material can be further increased with a glass fibre reinforcement, and the abrasion resistance can be further increased by an alloying in of elastomers.

In accordance with a further embodiment of the invention the guide roller can have concave or stepped cut-outs at its two end sides. Sufficient space is thereby provided opposite the widened edge of the bearing, which projects somewhat in the direction of the end sides of the guide roller, so that a contact or a rubbing between the widened edge of the bearing and the end side of the guide roller is excluded.

Preferably the guide roller can have a shaft which tapers at its two ends and which forms an extension which is made smaller by about a third of the original diameter. The ease of movement of the roller guide is thereby ensured since the shaft contacts the bearing only slightly (in a point-like manner) at the sides, and thus the lowest friction and nearly no abrasion arise.

In order to enable an inter-engagement of the brake device, the bearing shaft of the guide roller can be designed flexibly. Through this the bearing shaft bends through somewhat at high drawing forces or belt forces respectively so that the guide roller enters into engagement with a projection or an abutment which is provided.

The brake device can have at least one projection, which is preferably provided at the holder, by means of which the guide roller enters into engagement after the latter has been moved by the arising belt forces in the direction of the projection.

It is particularly advantageous if the brake device has at least one depression which is provided at the guide roller. In this case the projection provided at the holder can enter into engagement with the depression or depressions when the brake device is activated so that the guide roller is completely blocked. A particularly reliable engagement is achieved when the depression and the projection are formed substantially complementarily. A particularly rapid activation of the brake device is ensured when a plurality of depressions are uniformly distributedly arranged over the periphery of the guide roller.

Since the basic problem arises in particular in safety belt arrangements in which the skewing between the two belt bands amounts to at least 30°, the present invention produces particularly good results in a belt band configuration of this kind. The invention can in particular also be particularly advantageously used when the wrapping angle of the belt band about the guide roller amounts to at least 90°.

In a method in accordance with the invention the guide roller, which rotates when the belt band moves, is moved in the direction of a brake device at a predetermined belt force in order to brake or stop the rotation of the guide roller. In this the movement of the guide roller in the direction of an abutment or the like can be stopped by the corresponding choice of the elastic bearings or of an elastic shaft.

The guide roller is preferably moved reversibly away from the brake device when the belt force lets up.

In addition to the illustrated exemplary embodiments it is also possible to provide an active braking, for example through a setting member or the like.

The invention will be explained in the following in a purely exemplary manner with reference to advantageous embodiments and with reference to the accompanying drawings. Shown are:

BRIEF DESCRIPTION OF THE DRAWING

FIG. 3 a longitudinal section through a guide roller;

FIG. 4 a side view of a shaft;

FIG. 8 a perspective view of a safety belt arrangement with a skewed belt band.

DETAILED DESCRIPTION OF PREFERRED EMBODIMENTS

Figure 1:
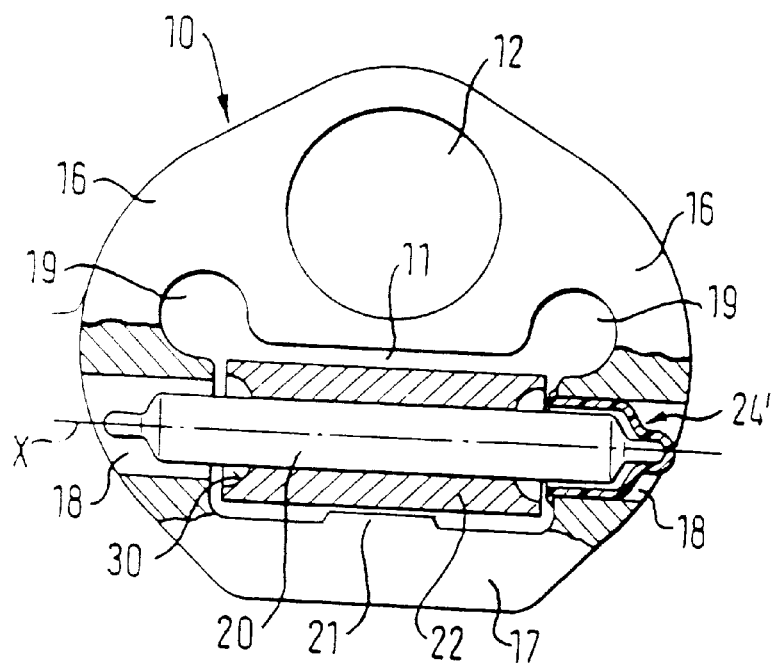
FIG. 1 a partially sectioned illustration of an embodiment of a safety belt arrangement in a frontal view.

FIG. 1 shows a safety belt arrangement having a holder 10 of metal which is approximately oval in a plan view and in which a basically rectangular and upwardly open cut-out 11 is provided for a cylindrical guide roller 22. Above the cut-out 11 a circular opening 12 is provided centrally in the holder 10 for the fastening of the holder 10 to a vehicle. A part formed of plastic can in each case be inserted into the front and rear side of the opening 12 in order to achieve a noise reduction in a pivoting of the holder 10.

The holder 10 is formed convexly above the cut-out 12, with limb-like outwardly arched formations 16 which run together into a web 17 below the cut-out extending in each case downwardly at the sides of the opening 12. Within the cut-out 11 and in the central region of the holder 10 two circular cylindrical apertures in the form of bores 18 are provided which in each case pass through a formation 16 and extend coaxially to one another and parallel to the web 17. Above the bores or apertures 18, which each serve for the reception of a bearing 24' (in FIG. 1 only the right bearing is illustrated), and extending at right angles to them, two circular guide openings 19, of which the edges extend in a convexly curved manner from the centre plane of the holder 10 to their front and rear sides and which open towards the upper side of the cut-out 11, are provided in the holder 10. These guide openings serve for the friction-poor guidance of the belt band in the event that the latter is rolled out or wound up at an inclination. The two bearings 24' journal a shaft 20 between themselves which is connected to the guide roller 22.

For the assembly of the roller guide the shaft 20 is introduced from one side of the holder 10 into a bore 18 from there and up to the oppositely disposed bore 18 of the other limb 16, with the guide roller 22, which after insertion of the shaft 20 is passed through by the latter, having previously been inserted in the cut-out 11 between the two limbs 16.

Then a bearing 24' is inserted from each side of the holder 10 into the passage bore 18 and is latched there. The shaft 20 now engages with each of its two ends into a bearing 24' and carries the guide roller 22, which is firmly latched on the shaft 20. The mounting of the holder 10 at a vehicle part, in particular at a B-pillar of a motor vehicle, is done through the circular opening 12 and the latched-in form parts.

As is further shown in FIG. 1, a projection 21 which points in the direction of the guide roller 22 and extends in the axial direction of the guide roller 22 is formed on approximately in the middle of the web 17. In a normal, that is, stress-free winding off of the belt band about the guide roller 22 no contact between the projection 21 and the outer periphery of the cylindrical guide roller 22 takes place. If, however, the belt force, that is, the drawing force exerted on the belt, increases beyond a certain, preset value, then the bearings 24' bend through correspondingly so that a frictional contact is effected between the projection 21 and the outer periphery of the guide roller 22. Through this the rotational movement of the guide roller is slowed down and finally stopped completely. When the belt force lets up, the bearings 24' again move elastically back to their initial position so that the guide roller 22 can rotate freely about its axis of rotation X. When the guide roller 22 is blocked the belt band 14 (cf. FIG. 8) does not move in the direction of the axis of rotation X of the guide roller 22. Rather, the belt band slides over the blocked guide roller without a transverse movement arising.

Figure 2:
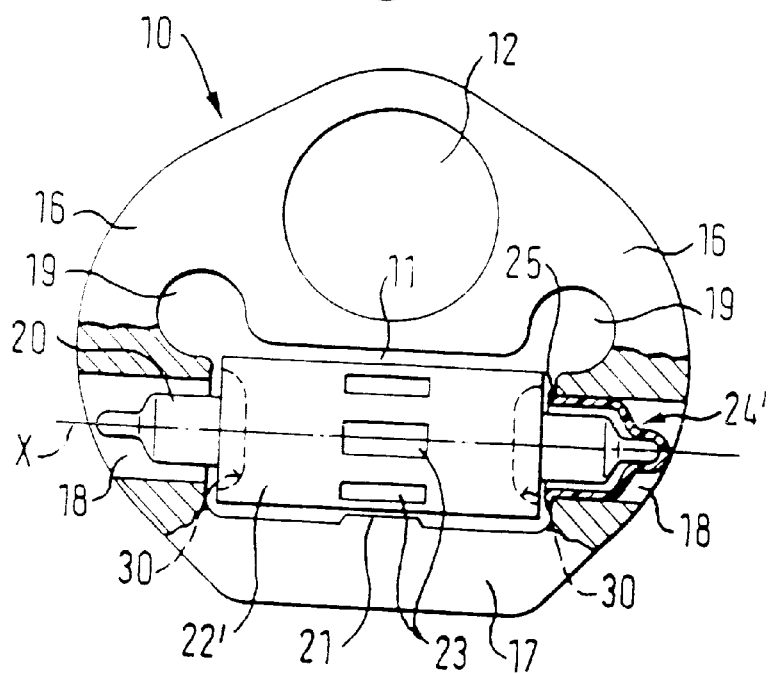
FIG. 2 a partially sectioned illustration of a further embodiment of a safety belt arrangement in a frontal view.

FIG. 2 shows a partially sectioned view of a further embodiment of a safety belt arrangement, with the same reference symbols being used for the same parts. The embodiment illustrated in FIG. 2 differs from that in FIG. 1 essentially in that cut-outs 23 which are distributed over the periphery and which are formed substantially complementarily to the projection 21 formed on the web 17 are provided at the outer periphery of the guide roller 22' and approximately in its centre. Here as well no contact takes place between the projection 21 and the guide roller 22' during normal operation. Only at a preset belt force do the bearings 24' (in FIG. 2 as well, only the right bearing 24' is illustrated) bend through to such an extent that the projection 21 engages into one of the cut-outs 23 and thereby blocks the guide roller 22' completely. Since the cut-outs 23 are uniformly distributed over the entire periphery of the guide roller 22', a rapid engagement into one of the cutouts 23 is ensured when a predetermined belt force is reached.

The bearing 24' illustrated in FIG. 2 corresponds to the embodiment illustrated in FIG. 6, which will be described in the following in more detail.

As can be well recognised in FIG. 2, the circular guide openings which are provided above and at both sides of the guide roller and which open in the direction of the upper edge of the guide roller serve for the guidance of the belt band when the latter is drawn out at an inclination with a low belt force (for example when the belt is being put on). As can furthermore be well recognised, the guide roller 22' has in each case cut-outs 30 at both of its end sides which prevent a contact between the guide roller 22' and the bearings 24'. The bearing 24' is located (as in the embodiment of FIG. 1 also) up to a broadened or widened edge 25 in the bore 18 and lies there with the outer surface of its region with the larger diameter in contact with the inner wall of the bore 18.

FIG. 3 shows a longitudinal section through the guide roller 22 illustrated in FIG. 1 which is provided with an axial passage bore 26.

Stepped cut-outs 30 are provided at the two end sides 28 of the guide roller 22. In the interior of the guide roller 22 illustrated in FIG. 3 a circumferential ring projection 32 is provided which serves for the latching on of the guide roller 22 on the shaft 20.

FIG. 4 shows in detail the shaft 20 illustrated in FIGS. 1 and 2, the ends of which have pin-like extensions with convex ends 34. Furthermore, the shaft 20 has two circumferential ring grooves 36, which serve for the latching in of the ring projection 32 of the guide roller 22. The pin-like extensions of the shaft 20 or also the entire shaft 20 can be designed flexibly in order to effect an elastic and flexible bending through of the shaft or of the shaft ends respectively when a certain belt force is reached so that the guide roller, which is fastened to the shaft, enters into engagement with the projection 21.

Figure 5:
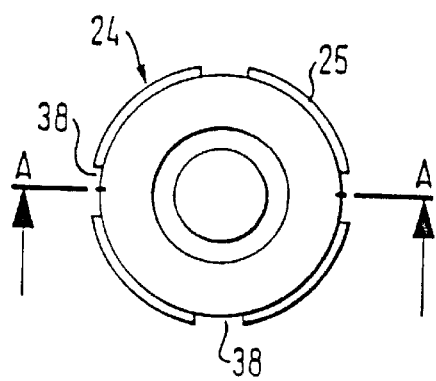
FIG. 5 a view of the open end side of a bearing.
Figure 5A:
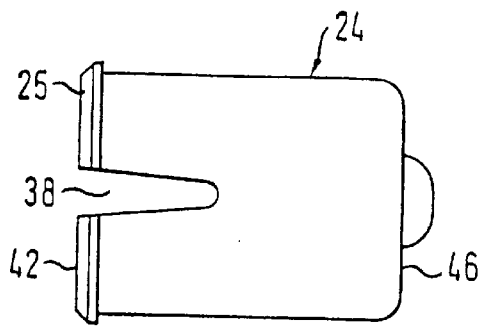
FIG. 5a a side view of the bearing of FIG. 5.
Figure 5B:
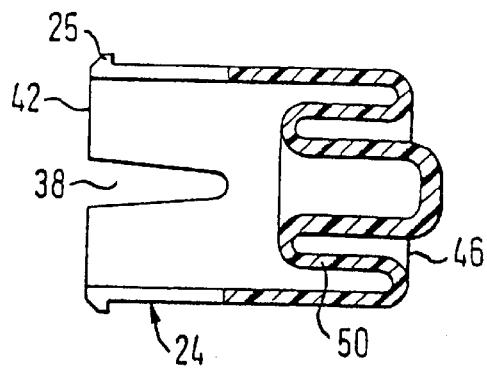
FIG. 5b a section along the section line A—A of FIG. 5.

FIG. 5 shows an enlarged front view and FIG. 5a an enlarged side view of a further embodiment of a bearing 24. A longitudinal section through this bearing is illustrated in FIG. 5b.

As these figures show, the bearing 24 has a sleeve-like form and is formed to be open at its (in FIGS. 5a and 5b) left end 42 and closed at the opposite end 46. At the outer periphery of the open end 42 the bearing 24 has a widened edge 25 which has a run-up inclination in order that the bearing can be inserted into the bore 18 of the holder 10.

Four slit-like cut-outs 38 extending in the axial direction are provided at the open end 42 of the bearing 24, with two cut-outs being arranged oppositely in each case. The cut-outs 38 are conically formed and extend over approximately one third of the bearing.

The bearing 24 is basically cylindrically formed and has two regions with different diameters, with the region of the larger diameter extending over nearly the entire length of the bearing 24. The region with the smaller diameter is located to the greatest extent inside the region with the larger diameter and is connected to the region with the larger diameter by a formation 50 which is meander-like in cross-section or is a section of varying diameter.

Figure 6:
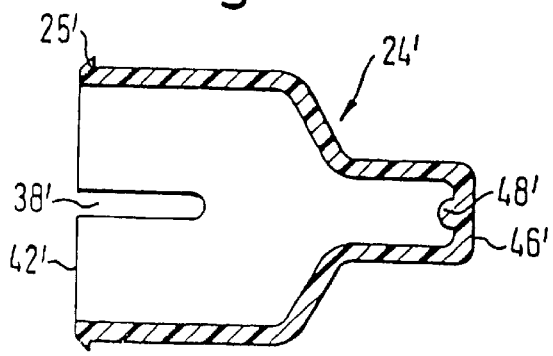
FIG. 6 a sectioned side view of a further embodiment of a bearing.

FIG. 6 shows in detail the bearing 24' shown in FIGS. 1 and 2 in which likewise a region with a larger diameter and a region with a smaller diameter are provided, with the transition region tapering conically and the region with the smaller diameter being located completely outside the region with the larger diameter, so that in cross-section a bottleneck-like arrangement is given. A convex bearing surface 48' which is concentrically positioned is arranged at the inner side of the closed end 46'. In this embodiment as well a widened edge 25' is provided at the open end 42' of the bearing 24'. Two cut-outs 38' which are substantially rectangularly formed extend from the open end 42' in the axial direction of the bearing. In this embodiment as well the smaller diameter amounts to about 40% of the larger diameter.

Figure 7:
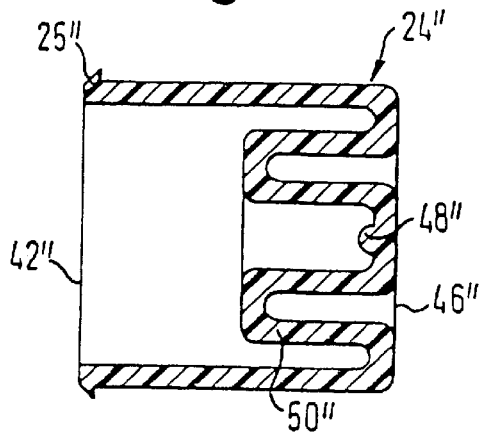
FIG. 7 a sectioned side view of a further embodiment of a bearing.

FIG. 7 shows the cross-sectional view of a further embodiment, which is similar to that illustrated in FIGS. 5 to 5b. In this embodiment the bearing 24" is formed in such a manner that the region with the smaller diameter lies completely inside the region with the larger diameter. At the inner end side of the closed end 46" a convex bearing surface 48" is provided centrally. The region with the smaller diameter extends over about 50% of the axial length of the bearing 24".

Finally it is pointed out that the guide roller 22, 22' itself can also be manufactured of an elastically deformable material so that it bends through flexibly when a predetermined belt force is exceeded in order to enter into engagement with a braking surface.

What is claimed is:

1. Safety belt arrangement comprising:

a holder adapted to be fastened pivotally about an axis to a vehicle part and which journals a guide roller between two bearings with at least a band part a belt band which partially wraps around the guide roller in a fastened state extending at an inclination to the axis of rotation of the guide roller; and a brake device, which is adapted to engage the guide roller at increased belt forces;

wherein the brake device includes a positive locking mechanism between the guide roller and the holder.

2. Safety belt arrangement in accordance with claim 1, wherein each bearing is sleeve shaped and is open at one end and is closed at an opposite end.

3. Safety belt arrangement in accordance with claim 2, wherein each bearing is widened at an outer periphery of the open end.

4. Safety belt arrangement in accordance with claim 2, wherein each bearing has at the closed end and in an interior a convex bearing surface which is arranged concentrically on the interior of the closed end.

5. Safety belt arrangement in accordance with claim 1, wherein each bearing is retained in an aperture in the holder.

6. Safety belt arrangement in accordance with claim 5, wherein each bearing is positioned so that a wall of the aperture contacts the outer surface of the region of greater diameter.

7. Safety belt arrangement in accordance with claim 5, wherein the aperture in the holder is executed as a passage bore.

8. Safety belt arrangement in accordance with claim 1, wherein the guide roller includes a shaft having convexly shaped ends.

9. Safety belt arrangement in accordance with claim 1, wherein each bearing is cylindrically shaped and has at least two regions with different diameters.

10. Safety belt arrangement in accordance with claim 9, wherein the region of greater diameter is located at the open end of each bearing and extends about one half the length of each bearing.

11. Safety belt arrangement in accordance with claim 9, wherein each bearing has a section of varying diameter between the two regions of different diameters.

12. Safety belt arrangement in accordance with claim 11, wherein the section of varying diameter extends at least partly inside the region with the greater diameter.

13. Safety belt arrangement in accordance with claim 1, wherein the angle between the incoming and outgoing band part is at least 30°.

14. Safety belt arrangement in accordance with claim 1, wherein each bearing comprises plastic.

15. Safety belt arrangement in accordance with claim 14, wherein the plastic of each bearing comprises polyoxymethylene (POM) which has a Teflon reinforcement.

16. Safety belt arrangement in accordance with claim 1, wherein the guide roller has two ends and cut-outs at both ends, wherein each cut-out includes concave sides.

17. Safety belt arrangement in accordance with claim 1, wherein the guide roller has a shaft which includes an extension at each end having a diameter of approximately one third of the diameter of the shaft midway along the length of the shaft.

18. Safety belt arrangement in accordance with claim 1, wherein the guide roller includes a flexible bearing shaft.

19. Safety belt arrangement in accordance with claim 1, wherein the positive locking mechanism includes a projection located at the holder.

20. Safety belt arrangement in accordance with claim 19, wherein the positive locking mechanism includes a depression located at the guide roller.

21. Safety belt arrangement in accordance with claim 20, wherein the depression and the projection are positioned substantially complementarily.

22. Safety belt arrangement in accordance with claim 20, wherein a plurality of depressions are arranged with uniform distribution over the periphery of the guide roller.

23. Safety belt arrangement in accordance with claim 1, wherein the wrapping angle of the belt band about the guide roller is at least 90°.

24. Safety belt arrangement in accordance with claim 1, wherein the guide roller has cut-outs at both ends, wherein each cut-out includes stepped sides.

25. Safety belt arrangement comprising:

a holder adapted to be fastened pivotally about an axis to a vehicle part and which journals a guide roller between two bearings with at least a band part of a belt band which partially wraps around the guide roller in a fastened state extending at an inclination to the axis of rotation of the guide roller; and a brake device, which is adapted to engage the guide roller at increased belt forces;

wherein each bearing is sleeve shaped and is open at one end and is closed at an opposite end; and wherein each bearing comprises a plurality of slit cut-outs extending parallel to an axis of rotation of the guide roller at the open end.

26. Safety belt arrangement in accordance with claim 25, wherein each bearing comprises two slit cut-outs positioned on opposite sides of the open end.

* * * * *